United States Patent

[11] 3,618,980

| [72] | Inventors | Maurice B. Leising<br>Clawson;<br>Gerald L. Holbrook, Troy; Douglas A.<br>Larson, Sterling Heights, all of Mich. |
|---|---|---|
| [21] | Appl. No. | 870,470 |
| [22] | Filed | Oct. 31, 1969 |
| [45] | Patented | Nov. 9, 1971 |
| [73] | Assignee | Chrysler Corporation<br>Highland Park, Mich. |

[54] TRAP FOR NONGASEOUS MATTER
8 Claims, 10 Drawing Figs.

[52] U.S. Cl. .................................................. 280/150 AB,
23/281, 55/455, 102/39
[51] Int. Cl. .................................................. B60r 21/08
[50] Field of Search ........................................ 280/150
AB; 23/281; 55/302, 455; 102/39; 9/2 A, 11 A,
321

[56] References Cited
UNITED STATES PATENTS

| 295,322 | 3/1884 | Albrecht | 55/455 X |
| 2,850,291 | 9/1958 | Ziccardi | 280/150 AB |
| 2,985,104 | 5/1961 | Fox | 102/39 |
| 3,066,014 | 11/1962 | White et al. | 23/281 |
| 3,336,045 | 8/1967 | Kobori | 280/150 AB |
| 3,477,740 | 11/1969 | Hass | 280/150 AB |
| 3,516,685 | 6/1970 | Goetz | 280/150 AB |
| 3,532,359 | 10/1970 | Teague et al. | 280/104 AB |
| 3,532,360 | 10/1970 | Leising et al. | 280/150 AB |

*Primary Examiner*—Leo Friaglia
*Assistant Examiner*—John A. Pekar
*Attorney*—Harness, Talburtt and Baldwin

ABSTRACT: Inflatable bag device including a gas generator containing an ignitable propellant, a bag adapted to be inflated by gas released from the propellant, and a trapping device for inhibiting movement of solid or molten material from the gas generator to the interior of the bag.

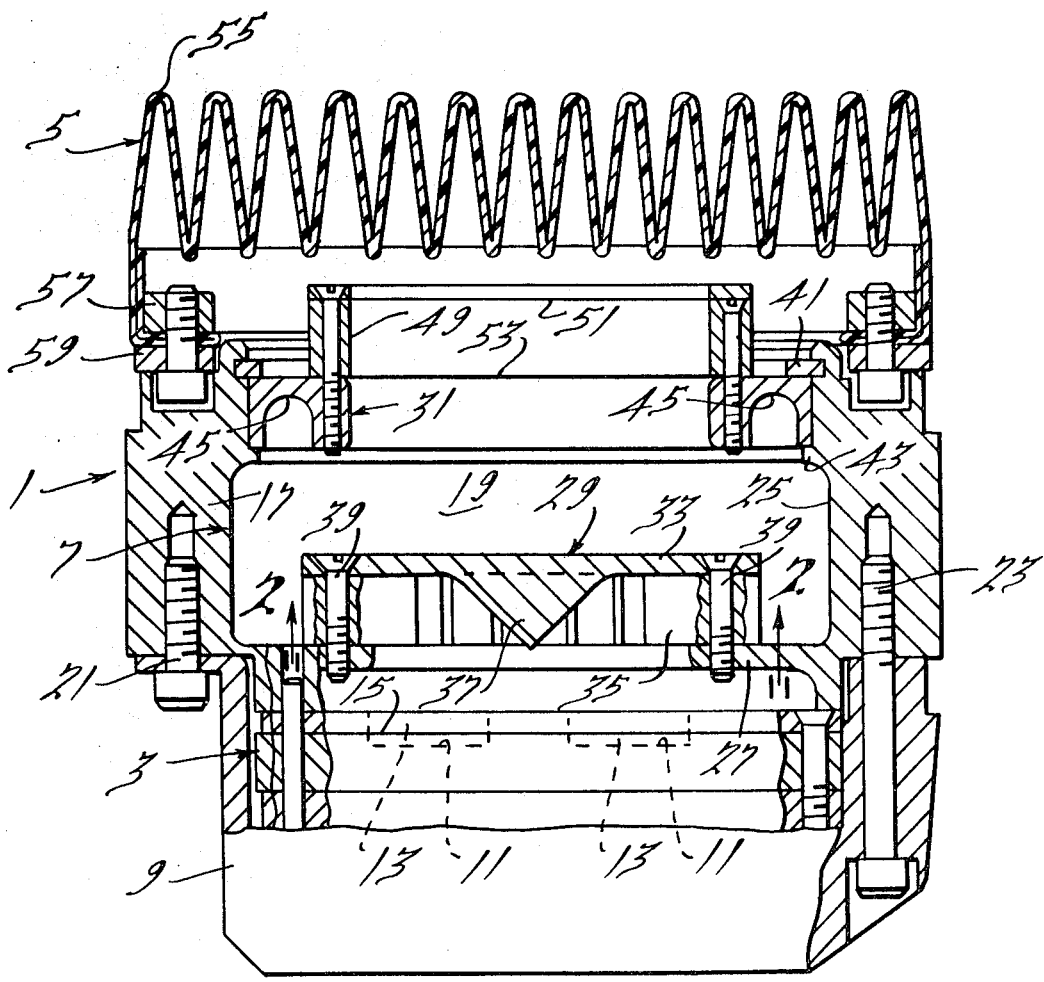
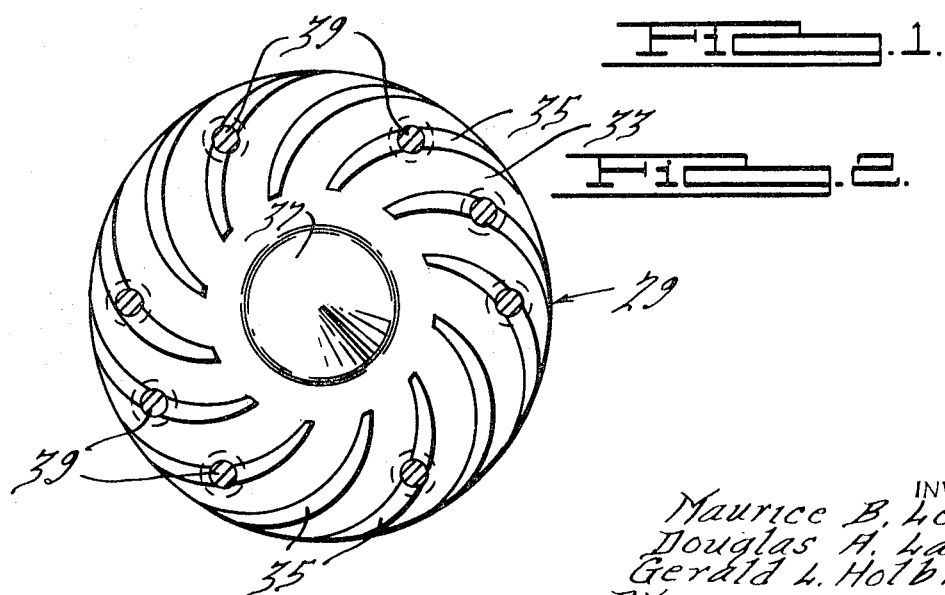
FIG. 1.
FIG. 2.
INVENTORS
Maurice B. Leising
Douglas H. Larson
Gerald L. Holbrook
BY Harness, Talburtt & Baldwin
ATTORNEYS INVENTORS.
Maurice B. Leising
Douglas A. Larson
Gerald L. Holbrook
BY Harness, Talburtt & Baldwin,
ATTORNEYS.

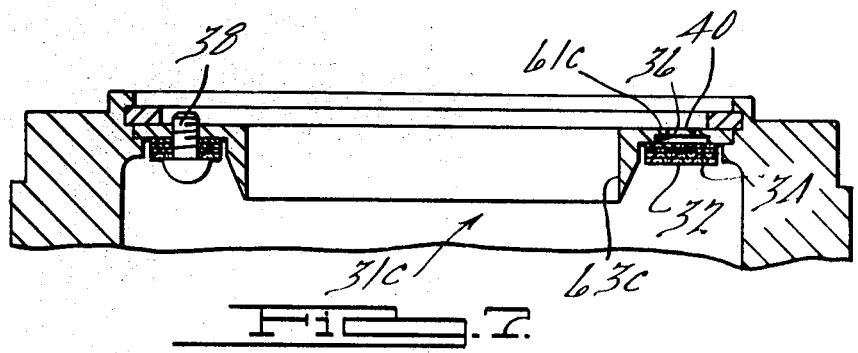
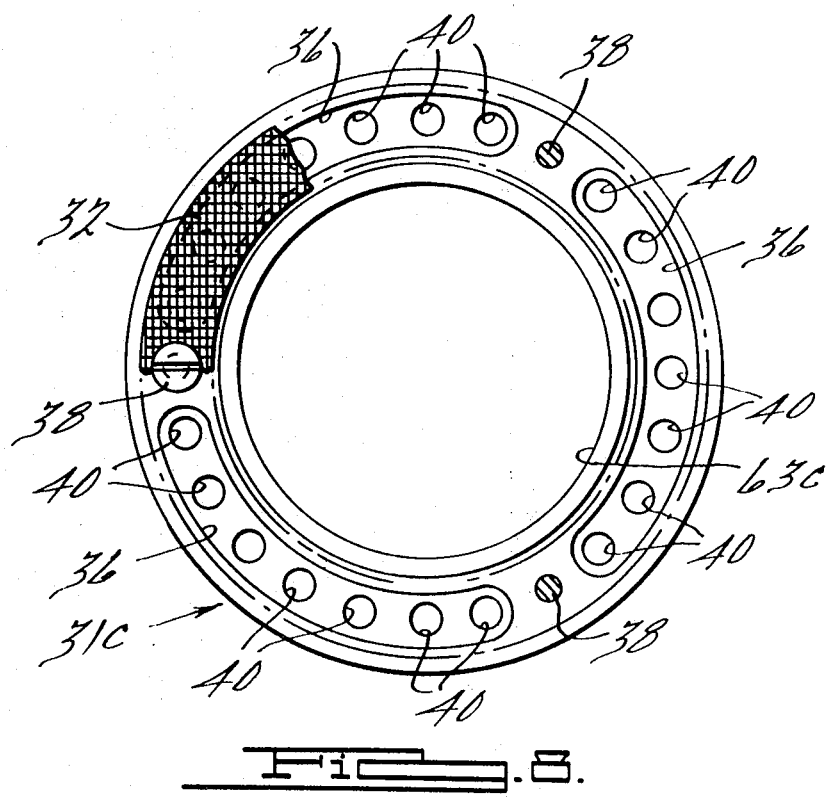

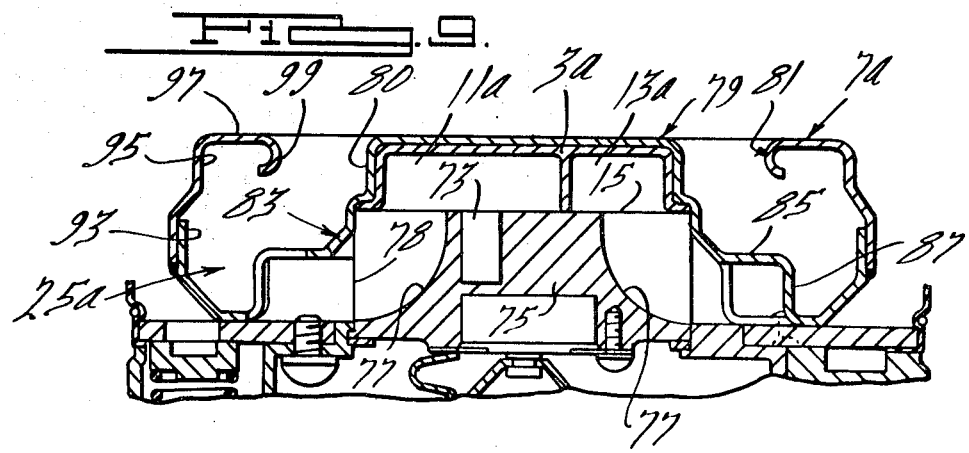
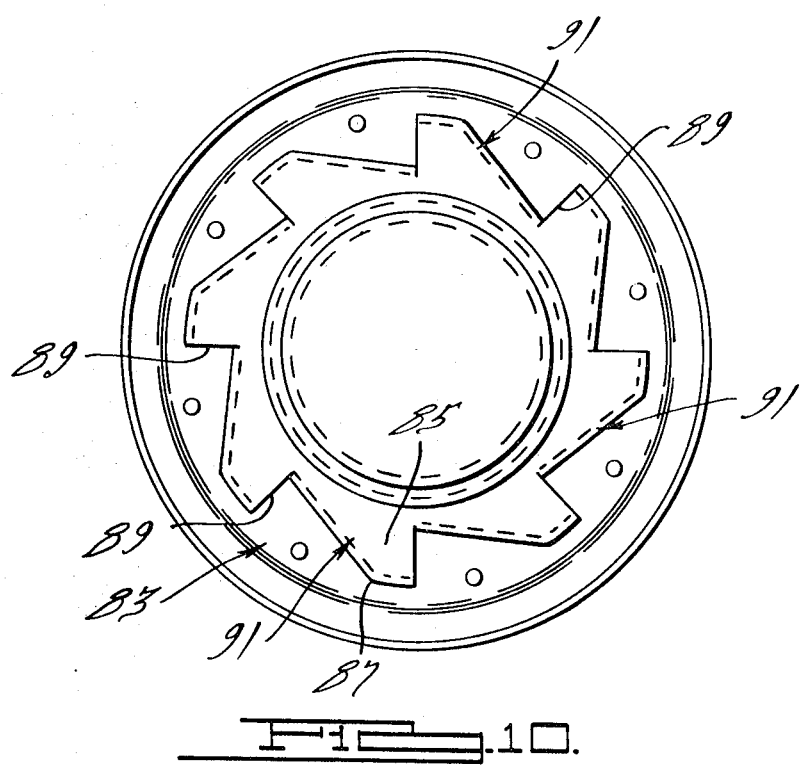

3,618,980

TRAP FOR NONGASEOUS MATTER

BACKGROUND OF THE INVENTION

This invention relates to a gas generator and inflatable bag device, particularly adapted for use in automatic vehicles, and more particularly to a device for preventing propellant emanating in a nongaseous state from the gas generator from reaching an inflatable bag or gas confining member.

Different types of gas source or generator and inflatable bag devices particularly adapted for use in automotive vehicles are known. For example, some of these devices employ a sealed cylinder of compressed gas connected directly or by a conduit to an inflatable bag mounted on the interior of the vehicle. A sensing device is conventionally provided for sensing rapid deceleration or change in velocity of the vehicle. Upon a predetermined change in vehicle velocity, such as upon impact with another object, the sensing device causes a signal to be sent to an actuating device for breaking the seal on the cylinder to release the gas to the bag. The latter inflates and provides a cushion against which an occupant may be thrown by the impact.

Another type of generator comprises a housing holding a supply of propellant adapted to be ignited in response to a signal indicative of a collision of predetermined magnitude. The propellant undergoing chemical reaction releases gas to expand the inflatable bag. A device of this general type is disclosed in copending U.S. Pat. application Ser. No. 746,333, filed July 22, 1968.

The propellant undergoes combustion to release the inflating gas, and it is highly desirable to keep the burning particles or masses of propellant from entering the bag being inflated. It is also desirable to keep all other particles from entering or being propelled with high velocity into the bag. The present invention is directed toward a device for inhibiting such occurrences.

SUMMARY OF THE INVENTION

Briefly, the invention comprises a gas generator, an inflatable bag, and means for inhibiting movement of certain materials into said bag.

One of the primary objects of this invention is to provide a device for inflating a bag which enhances combustion of the propellant which releases gas.

A further object of this invention is to provide a device for inflating a bag wherein particles of combustible propellant employed for inflating the bag are trapped and entry into the bag is inhibited.

Another object of this invention is to provide a device such as described, which retains the particles or nongaseous masses of propellant until the complete combustion thereof.

A further object of this invention is to provide a device of the class described which prevents molten propellant and residue form being discharged into the bag being inflated.

Still another object of this invention is to provide a device such as described which enhances thorough mixing of the propellant.

Another object of this invention is to provide a device of the type described which is adapted to effect cooling of the propellant undergoing combustion.

A further object of this invention is to provide a device of the class described which is economical in construction and efficient in operation.

Other objects and advantages of this invention will be made apparent as the description progresses.

BRIEF DESCRIPTION OF THE DRAWINGS

In the accompanying drawings in which several of the various possible embodiments are illustrated, FIG. 1 is a side elevation of one embodiment of a device constructed in accordance with this invention, certain parts being shown in section;

FIG. 2 is a section taken along line 2—2 of FIG. 1;

FIG. 7 is a fragmentary side elevation of a fourth embodiment of this invention;

FIG. 8 is a bottom plan view of FIG. 7;

FIG. 9 is a side elevation of another embodiment of this invention; and

FIG. 10 is a section taken generally along line 10—10 of FIG. 9.

Like parts are indicated by corresponding reference characters throughout the several views of the drawings.

DESCRIPTION OF THE PREFERRED EMBODIMENT

Figure 3:
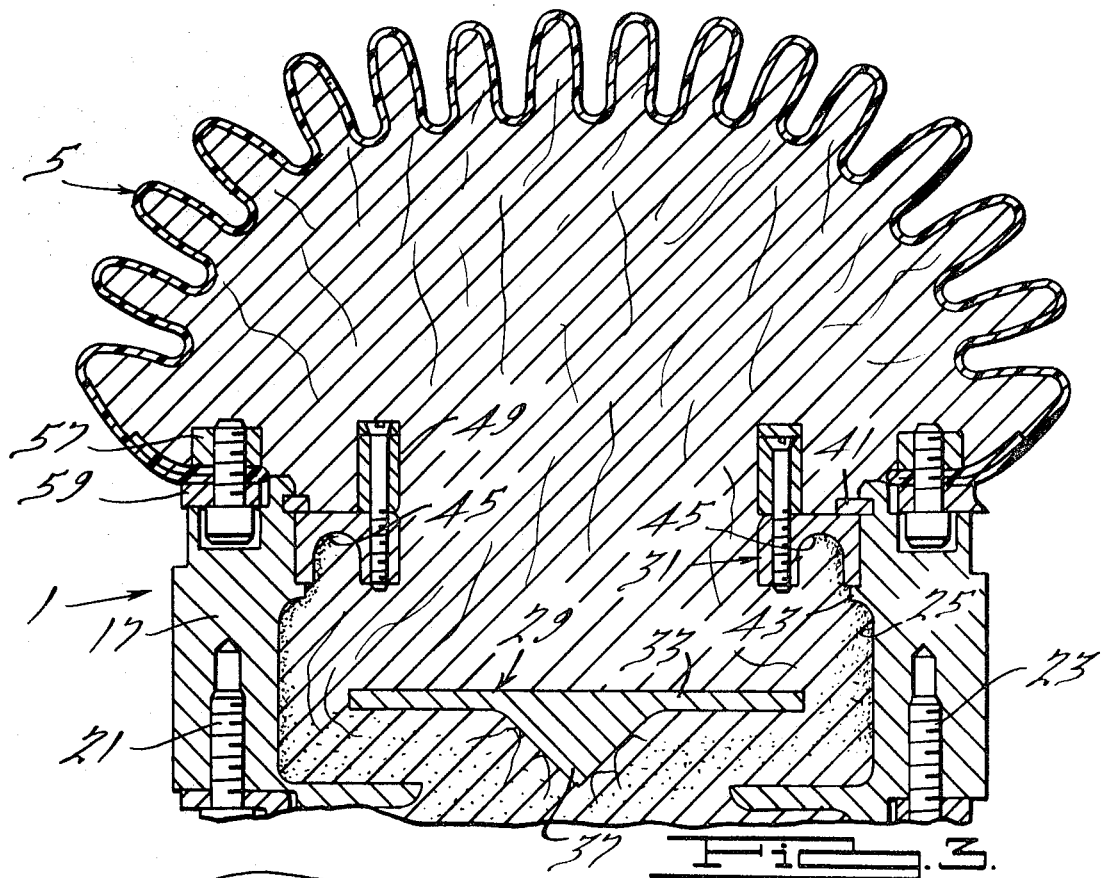
FIG. 3 is a view generally similar to FIG. 1 showing the device during initial stages of inflation of the bag.
Figure 4:
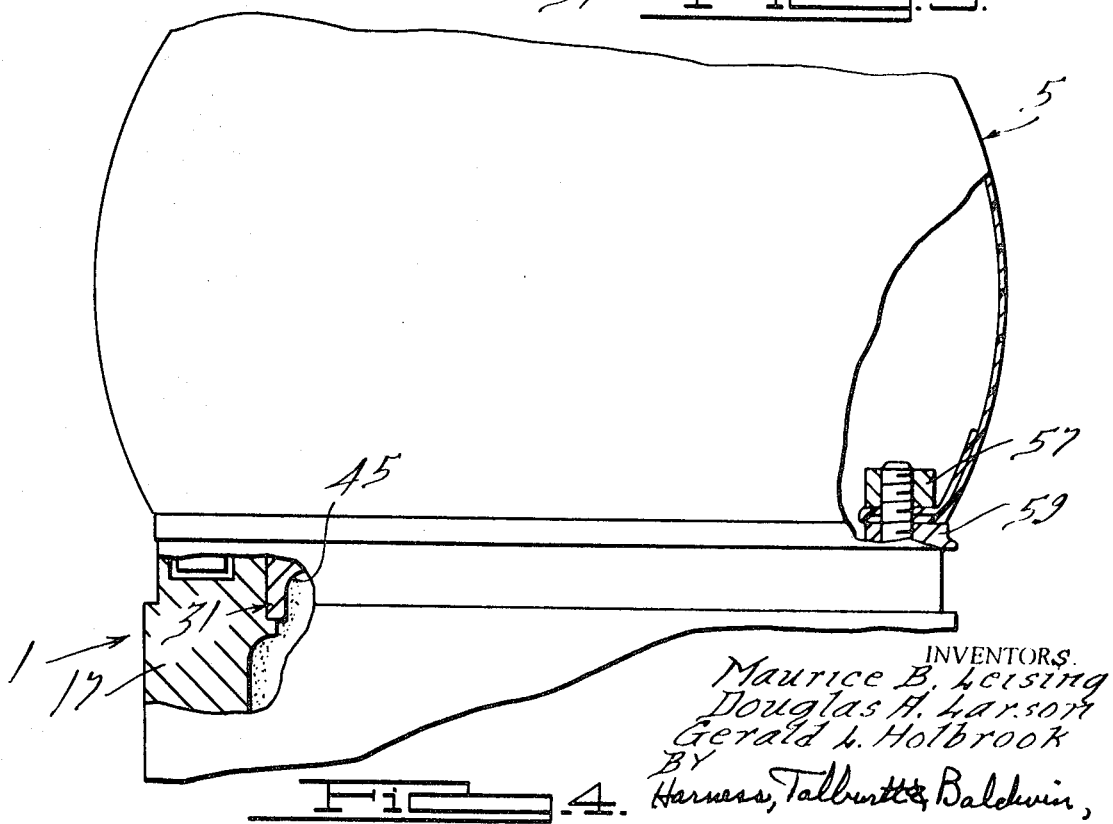
FIG. 4 is a view generally similar to FIG. 3 showing the device during final stages of inflation.

Referring now to the drawings, a gas generating and inflatable bag device constructed in accordance with this invention is generally shown at 1. The device basically includes a gas generating section or container 3, an inflatable bag or gas-confining means 5, and a nongaseous matter trap 7.

More specifically, device 1 includes a housing 9 supporting generator 3. Generator 3 has one or more compartments 11 therein in which propellant 13 is stored.

Suitable ignition means (not shown) are provided for igniting the propellant in response to a signal from a sensor, indicative of a collision or deceleration of predetermined magnitude. The generator 3 and propellant 13 form a gas source. A suitable rupturable membrane 15 extends across the generator outlet to retain the propellant in the generator until the propellant is ignited and sufficient pressure developed to rupture the membrane. The propellant may be of a type disclosed in copending application Ser. No. 746,333, i.e., black powder, which is adapted to ignite and react within a few milliseconds, releasing gas in the process. The generator 3, including propellant 13, thus constitutes an inflation means.

Trap 7 includes a housing 17 having a central cavity or passage 19 therein. Housings 9 and 17 are connected together by a plurality of fasteners 21 and 23. The central portion of passages 19 is formed into a generally circular or looped material confining chamber or passage 25 by an inwardly extending ledge or shoulder 27, a directing means or deflector 29 at one end and a retaining ring 31 at the other end. In the form shown, the deflector 29 includes a plate member 33 having a plurality of curved deflecting vanes 35 extending away from one side thereof. As shown, the deflecting vanes 35 have a concave and a convex side with a radially inner end of each vane being located on a radially line relative to the center of the member 35 which is angularly separated from a radial line passing through the radially outer end of the vane, i.e., the inner and outer ends of each vane are angularly offset from one another. It is desirable that the vanes be so formed that any gas and other materials entering the space between the inner ends of two adjacent vanes are directed away from the deflector 29 in a direction which will cause the materials to travel outwardly to the outer wall of chamber 25 and thence along such wall around the chamber.

The plate 33 also has a generally cone-shaped diverting portion 37 extending away from the plate in the same direction as the vanes 35. Any gas or materials impinging on the cone are directed and deflected toward the vanes. The deflector 29 is located over the gas generator 3 and covers the opening formed by ledge 27. Fasteners 39 extend through plate 33 and some of the vanes 35 into threaded holes in ledge 27 to secure the deflector to the housing 17.

As noted previously, the chamber 25 is preferably circular. The annular ring 31 is clamped in a position adjacent the outlet from chamber 25 by clamping ring 41. The ring 31 is seated on a shoulder 43. Ring 31 has an annular recess or trough 45 opening toward chamber 25. Particles which move up the wall of chamber 25 as the particles travel around the chamber will eventually move into trough 45 where as discussed hereinafter, they will be trapped until they are consumed by combustion.

If desired, a chamber 49 may be connected to the discharge side of trap 7. Chamber 49 may be filled with a supply of material, such as coolant, for example, adapted to react with the elements of combustion to affect the characteristics thereof. For example, a material such as disclosed in copending application Ser. No. 746,560, filed July 22, 1968, may be used if desired. Suitable retaining means, such as diaphragms 51 and 53 may be employed for retaining the material in the chamber 49. When the pressure within chamber 25 increases to a predetermined value due to the burning of propellant 13 and the release of gas, the diaphragms on chamber 49 will burst and permit the material within the chamber to mix with the burning propellant.

The inflatable bag 5 is folded in a manner to provide a plurality of folds 55 therein located side by side and extending generally away from the gas generator 3. The outer edges of the bag 5 are folded double and secured to the periphery of the device between two clamping rings 57 and 59. The clamping rings are connected to the body 17 by conventional fasteners not shown.

Operation of the apparatus of this invention is as follows:

Assuming the various parts are in the position shown in FIG. 1, the propellant is initially ignited. Within a few milliseconds, a pressure sufficient to rupture the membrane or diaphragm 15 is attained and the diaphragm ruptures. The pressure of the gas released in the generator causes the propellant undergoing combustion to be discharged or propelled upwardly toward the deflector 29. The combustible propellant and the gas are directed toward the vanes 35 by cone 37 and also as a result of the pressure built up in the space between generator 3 and deflector 29.

As the propellant undergoing combustion and the gas move through the vaned section, the vanes direct all of the materials passing through the section toward the wall of chamber 25 at a point angularly spaced from the point at which such material exits from the vaned section. This causes the materials to travel in a generally circular path after they reach the wall of the chamber. This also causes the materials undergoing combustion and the materials which are not yet undergoing combustion to mix, thereby enhancing combustion of the propellant. The gas passing through the vane section into the chamber 25 is forced, due to the increase of pressure behind such gas, from the chamber and up through the opening in ring 31 and through the chamber 49 into the bag 5. If chamber 49 is provided with a supply of coolant material, for example, such coolant material will be mixed with the gas as the latter ruptures the diaphragms 53 and 51 and inflates the bag.

The particles, globules and pieces of reacting propellant emerging from the vaned section of the deflector 29 will move in a substantially straight line, due to their inertia, to the wall of chamber 25, and then travel around the wall of the chambers as they are consumed. Due to their mass and velocity the reacting particles are kept in the chamber until they are converted to gas. As more and more gas and reacting particles of propellant emanate from the deflector 29, and since some reacting particles may emanate from the deflector 29 on the path inclined upwardly relative to the ledge 27 and hence tend to spiral upwardly, many globules and particles may be forced and move upwardly along the wall of chamber 25 into the trough 45 where they are retained until they are converted to gas or until the bag is in an inflated condition.

It will be understood that the above described action is somewhat theoretical since the whole process of combustion and inflation takes place in a very short period of several milliseconds and an actual recording of the events occurring within the chamber is difficult to accomplish. However, the apparatus was was designed to provide occurrences as above described and inspection of units and interpretation of the physical indicators left on a unit after an inflation operation indicate that the above described sequence of events does apparently occur.

It will be seen that the device described prevents particles or parts of the propellant from moving directly from the generator to an inflatable bag, the particles being caught in a trap until they are substantially converted to gas. Moreover, the deflector 29 and chamber 25 enhance thorough mixing and hence complete combustion of the propellant.

Figure 5:
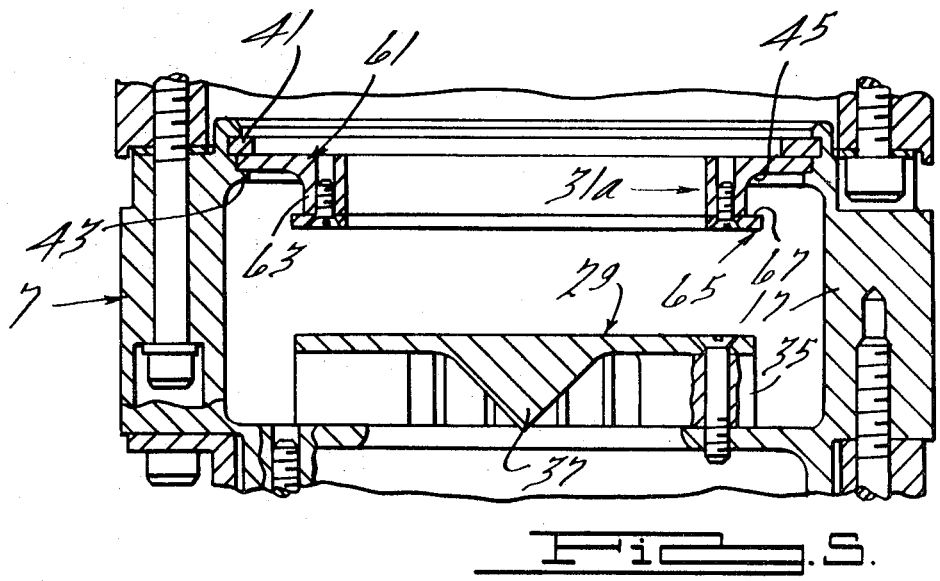
FIG. 5 is a fragmentary side elevation of a second embodiment of this invention.
Figure 6:
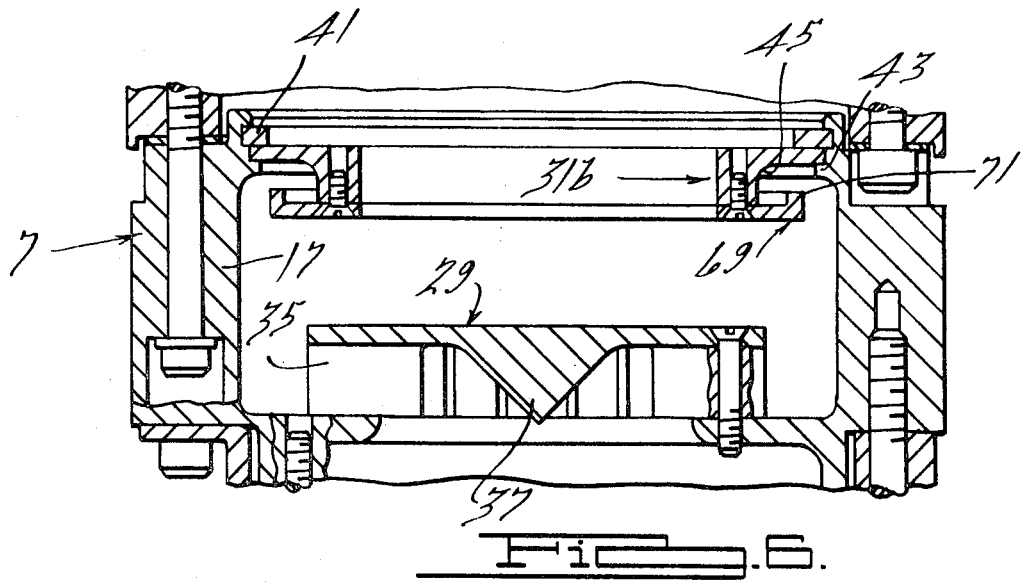
FIG. 6 is a fragmentary side elevation of a third embodiment of this invention.

Modified forms of retaining devices are shown at 31a and 31b in FIGS. 5 and 6, respectively. Device 31a includes an annular ring on plate 61 having a neck portion 63 extending toward and into chamber 25. An annular ring or plate 65 is secured to the lower end of neck 63 and has an outer diameter greater than the outer diameter of the adjacent portion of neck 63 thereby providing a lip 67. The device 7a combines with the upper portion of chamber 25 to form a trapping trough for hot particles or globules of burning propellant.

Device 31b is generally similar to device 31a except annular plate or ring 65 of device 31a is replaced by an annular plate 69 having a shoulder or flange 71 extending upwardly from the outer edge thereof. Both devices 31a and 31b provide retaining ledges for the retaining troughs 45.

A further embodiment of the retaining device is shown at 31c in FIGS. 7 and 8. Device 31c includes an annular portion 61c having a neck portion 63c extending toward and into chamber 25. Device 31c has a liquid trap formed in annular portion 61c. The liquid trap is formed by a screen matrix 32 preferably constructed of a plurality of layers of screen material. The matrix 32 is located in an annular trough 34, the bottom of which has a plurality of elongated recesses 36 therein. Each recess has a plurality of holes 40 extending through the annular portion 61c. The screen matrix 32 is secured in position by a plurality of fasteners 38.

As molten liquid masses of propellant move up the wall of chamber 25 they will eventually contact the screen matrix 32. As soon as the liquid masses contact the matrix 32 they cool, i.e., the matrix take heat from the molten masses, and solidify. Since the pressure on the bag side of the annular portion 61c is initially considerably less than the pressure in the chamber 25, gas generated by propellant undergoing combustion will be forced through the screen 32, recesses 36 and holes 40 for inflating the bag. Naturally, gas will also pass through the opening formed internally by the neck portion 63c. It will thus be seen that the trap of this embodiment permits gas to pass freely to the bag, but prevents the passage of liquid molten masses of propellant to such bag.

Another embodiment of the gas generator and inflatable bag device is shown generally in FIGS. 9 and 10. The device includes a gas generator section 3a having one or more compartments 11a therein for holding a supply of gas generating material, such as combustible propellant 13a. A suitable ignition means 73 is provided for igniting the propellant 13a. A diaphragm or membrane 15a may be provided between the outlet of the compartments 11a and the inlet of a chamber forming body 75. The body 75 has one or more passages 77 therein which direct the products emanating from the gas generator 3a to a trap 7a. If desired, the passage or passages 77 may be filled with material, such as coolant material for example, adapted to mix with, react and cool the gases of the propellant. A diaphragm 78 may be provided for retaining material in the passages 77.

As shown, trap 7a comprises two stampings 79 and 81 which together form the same functions as diffuser 29, chamber 25 and retaining member 31 of the embodiment shown in FIGS. 1–4. Stamping 79 includes a cup-shaped portion 80 which fits over generator 3a. The cup-shaped portion 80 is integrally joined with a diffusing portion 83. Portion 83 is formed by a first annular wall 85 integrally connected to a second annular wall 87, extending substantially perpendicular to wall 85, the walls 85 and 87 being cut along lines 89 and formed into diffusing vanes 91.

Vanes 91 will cause the materials entering on the inner side of portion 83 to be discharged from the portion 83 in a generally tangential direction into a chamber 25a formed by an annular wall 93. The materials discharged into chamber 25a will travel around the chamber with the heaviest materials being on the outside toward the wall 93.

Stamping 81 is secured to wall 93 by welding, for example, and includes a wall 95 which forms an extension of wall 93. An inwardly directed ring-shaped portion 97 has a lip 99 thereon which aids in trapping particles or globules of molten propellant in the trap 7.

Operation of the apparatus shown in FIGS. 9 and 10 is generally as follows:

Ignition of the propellant 13a releases gas which raises the pressure in generator 3 and causes membrane 15a to burst. The combustible material and products are discharged through passage or passages 77, where, if such passages contain a material, such as coolant, mixture of such coolant and products takes place. The diaphragm 78 will burst and permit the products to be discharged from the passage or passages 77 into the diffusing portion 83. The vanes 91 cause the products to enter into chamber 25a so that they move around the chamber. The heaviest particles and globules of the combustible materials move against the wall 93. The gas produced by the combustible process passes out of the chamber 25 and begins inflation of the bag 5a. As the particles and globules of combustible material are consumed by combustion, the gas released therefrom also escapes from the chamber 25a and enters the bag 5a. Should any of the materials move or be forced into the area adjacent annular ring 97, the lip 99 inhibits the escape of such material from the trap until consumed by combustion.

In view of the foregoing, it will be seen that the several objects of this invention are achieved.

While several embodiments of the invention have been disclosed and described, it is apparent that other embodiments and modifications of the invention are possible.

We claim:

1. An inflatable device comprising an inflation means, container means for holding said inflation means, an inflatable means connected to said container means, means for releasing said inflation means from said container means for inflating said inflatable means, and confining means adjacent said container means, said container means directing said inflation means into said confining means in a direction to enhance movement of said inflation means around said confining means, said container means including a gas generator body, said inflation means including propellant in said body adapted to release gas, said propellant being discharged from said generator in a gaseous state and a nongaseous state, said container means including directing means for causing heavier masses of said propellant to move to the outside of said confining means, said propellant in a gaseous state being permitted to escape from said confining means, said directing means comprising a plurality of vanes for directing all of said inflation means into said confining means in said direction to enhance movement of said inflation means therearound.

2. An inflatable device as set forth in claim 1 wherein said confining means comprise a generally loop-shaped chamber located in a plane generally perpendicular to the initial direction of flow of said inflation means.

3. An inflatable device as set forth in claim 2 wherein said confining means further comprises a generally loop-shaped retaining means for inhibiting movement of said nongaseous inflation means out of said chamber.

4. An inflatable device for an automotive vehicle comprising an inflatable bag, means for generating gas for inflating said bag, said means including a reservoir, combustible propellant in said reservoir adapted upon combustion to release gas, some of said propellant being discharged from said reservoir in a nongaseous state, said gas and propellant in a nongaseous state moving in a first general direction upon being discharged from said reservoir, directing means for directing all of the gas and nongaseous propellant discharged from said reservoir into a plane of movement generally normal to said first direction, and confining means for inhibiting movement of said nongaseous propellant into said bag, said confining means comprising a generally loop-shaped chamber, and retaining means adjacent the outlet of said chamber for retaining nongaseous propellant.

5. An inflatable device as set forth in claim 4 wherein said directing means comprises a plurality of vanes for directing said propellant into said chamber in a direction to enhance movement of said propellant therearound.

6. An inflatable device as set forth in claim 5 wherein said chamber is generally circular in shaped.

7. An inflatable device for an automotive vehicle comprising an inflatable bag, means for generating gas for inflating said bag, said means including a reservoir, combustible propeller in said reservoir adapted upon combustion to release gas, said gas being discharged from said reservoir, some of said propellant being discharged from said reservoir in a nongaseous state, confining means, directing means for directing the gas and nongaseous propellant discharged from said reservoir into said confining means, said confining means inhibiting movement of said nongaseous propellant into said bag, said confining means comprising a generally loop-shaped chamber, said directing means including a plurality of vanes for directing all of said propellant into said chamber in a direction to enhance movement of said propellant therearound, said chamber being generally loop-shaped, retaining means adjacent the outlet of said chamber, said retaining means including trough forming means generally loop-shaped in configuration and surrounding said outlet.

8. An inflatable device for an automotive vehicle comprising an inflatable bag, means for generating gas for inflating said bag, said means including a reservoir, combustible propellant in said reservoir adapted upon combustion to release gas, said gas being discharged from said reservoir, some of said propellant being discharged from said reservoir in a nongaseous state, confining means, directing means for directing the gas and nongaseous propellant discharged from said reservoir into said confining means, said confining means for inhibiting movement of said nongaseous propellant into said bag, said confining means comprising a generally loop-shaped chamber, said directing means including a plurality of vanes for directing all of of said propellant into said chamber in a direction to enhance movement of said propellant therearound, said chamber being generally circular shape, retaining means adjacent the outlet of said chamber, said retaining means including trough forming means generally circular in shape, said trough forming means being spaced from the area of said confining means into which said propellant is directed by said vanes and surrounding said outlet.

* * * * *